Jan. 31, 1933.  H. F. ELLIOTT  1,895,614
AUTOMATIC PHONOGRAPH
Filed July 23, 1928   6 Sheets-Sheet 1

INVENTOR
Harold F. Elliott
By John Flam
ATTORNEY

Jan. 31, 1933.　　　H. F. ELLIOTT　　　1,895,614
AUTOMATIC PHONOGRAPH
Filed July 23, 1928　　6 Sheets-Sheet 2

INVENTOR
Harold F. Elliott
By John Flam
ATTORNEY

Jan. 31, 1933.　　　H. F. ELLIOTT　　　1,895,614
AUTOMATIC PHONOGRAPH
Filed July 23, 1928　6 Sheets-Sheet 3

INVENTOR
Harold F. Elliott
By John Flam
ATTORNEY

Jan. 31, 1933.   H. F. ELLIOTT   1,895,614
AUTOMATIC PHONOGRAPH
Filed July 23, 1928   6 Sheets-Sheet 4

INVENTOR
Harold F. Elliott
By John Flam
ATTORNEY

Jan. 31, 1933.  H. F. ELLIOTT  1,895,614
AUTOMATIC PHONOGRAPH
Filed July 23, 1928  6 Sheets-Sheet 6

INVENTOR
Harold F. Elliott

By John Flam
ATTORNEY

Patented Jan. 31, 1933

1,895,614

UNITED STATES PATENT OFFICE

HAROLD F. ELLIOTT, OF PALO ALTO, CALIFORNIA, ASSIGNOR OF ONE-FOURTH TO JOHN FLAM, OF LOS ANGELES, CALIFORNIA

AUTOMATIC PHONOGRAPH

Application filed July 23, 1928. Serial No. 294,723.

This invention relates to phonographs, and especially to devices of this character that are arranged automatically to play a number of records in succession.

A common form of automatic phonograph involves the use of mechanism whereby a series of records can be supported in succession above a horizontal rotating table, and an arm is used, first, to place the first record on the table; second, to remove the record when it has been played; and third, to place the succeeding record on the table. Simultaneously the tone arm or electric pick-up is shifted to begin the new record. This cycle is repeated until all the records in the series are played.

This old form of mechanism is complicated. It furthermore can be arranged to play record discs in a series that are all of the same size; that is, either 10 inch or 12 inch, but it cannot play records in a series in which there are both 10 inch and 12 inch records.

It is one of the objects of my invention to provide an automatic phonograph that is not only simple in structure, but that can play a series of records in which the sizes are mixed.

I attain this object by providing a rotating table that has its axis inclined to the vertical, and placing thereon a pile of records one on top of another. Therefore it is still another object of my invention to provide a phonograph with a table that rotates about an inclined axis.

My invention possesses many other advantages, and has other objects which may be made more easily apparent from a consideration of several embodiments of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
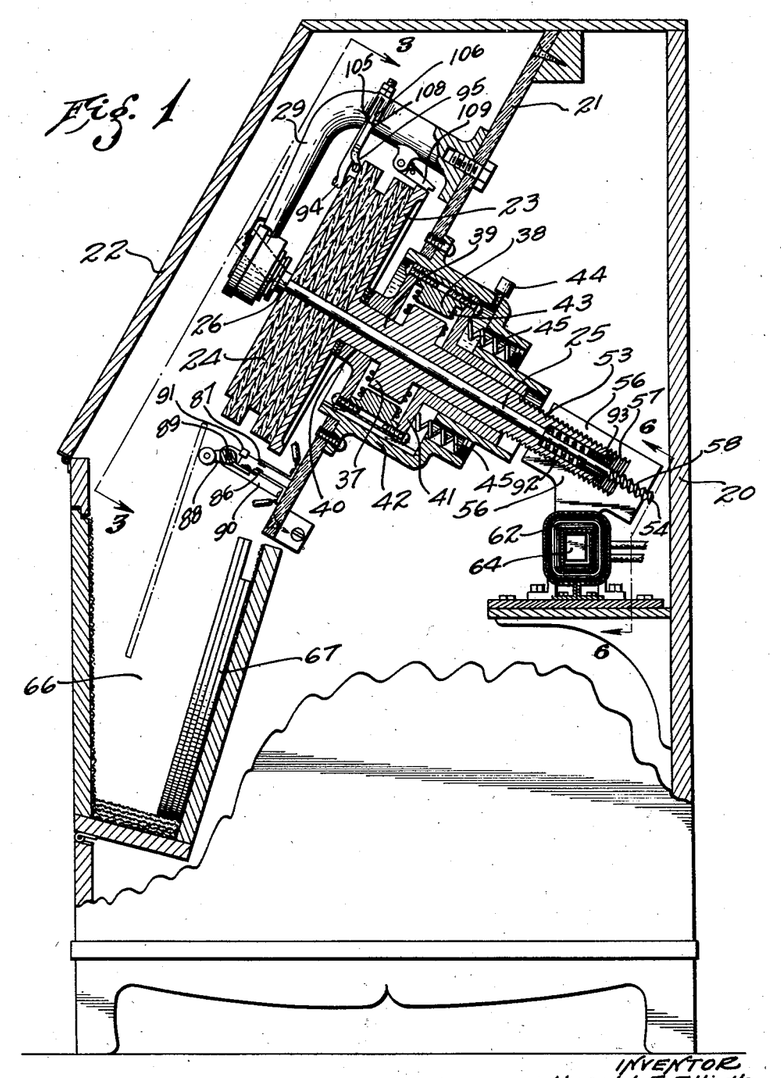
Figure 1 is a partial sectional view, taken in a vertical plane, and illustrating, mainly in a diagrammatic manner, the operating parts of my invention.

In Fig. 1, the phonograph apparatus is shown as housed in a cabinet 20, in which a sloping support 21 is accommodated, for supporting substantially all of the parts of the mechanism. The cabinet 20 can be provided with a hinged front cover 22, whereby access to the operating parts can be had.

The turntable 23 upon which the stack of records 24 can be placed, is arranged to rotate about an axis that is inclined about 30° to the horizontal. In the present instance, it is shown as having a spindle 25 (shown in detail in Fig. 4) which serves to hold the records 24 in alinement. This spindle engages a member 26 provided with a depression to guide the spindle. This member 26 is rotatable in support 27. The arrangement is such that while the apparatus is playing a record, the member 26 presses the records 24 together, so that sufficient friction is provided to ensure against slipping between the records, and they all rotate with table 23 as a unit.

For this purpose, support 27 in which member 26 is rotatable (as by providing ball bearings 28 between shoulders provided on member 26 and support 27) and table 23 are urged relatively toward each other, as by spring pressure, in a manner to be hereinafter described.

The support 27 is accommodated in a supporting arm 29 supported on shelf 21, and extending above the center of table 23. This arm 29 has a hollow head 30 capped by an apertured cover 31. In this head is a step-bearing 32, providing a ball 33 against which the end of member 26 is urged. To this bearing 32 is fastened the support 27, as by threads and a collar 33¹.

Preferably the relative axial movement between table 23 and member 26 is provided for by axial movement of the table 23, but obviously this arrangement could be reversed. In addition to this main relative movement, the pressure exerted on member 26 by the movement of spindle 25 upwardly, causes certain contacts to be controlled, whereby the withdrawal of the table 23 as hereinafter explained will serve to reset the pick-up mechanism to position it over the outer groove of the next record to be played. Thus bearing 32 has a limited axial movement in head 30, and is guided therein as by flange 34. A spring 35 acting on this flange urges the bearing 32 toward the table 23. When the table is moved away from head 30, the bearing 32 moves away from a contact arm 36 supported, but insulated, from arm 29. The purpose of arm 36 will be described in connection with the mechanism for beginning the reproduction of a record.

The mechanism associated with table 23 will now be described. This table is shown in Fig. 1, as being rotated by an electric motor 38 although other equivalent means could be used. Thus the rotor 37 of the motor 38 is shown as supported directly on an extension 39 of the table. This extension is journalled at 40 in frame 41 that is guided for axial movement in a cylinder support 42, fastened to shelf 21. This frame 41 carries the stator 43 that is arranged to be supplied with electric current to energize the motor. Preferably the frame 41 is splined in cylinder 42 to prevent relative motion between the two parts; and the frame 41 and cylinder 42 can also conveniently serve as an air dash pot to ease or damp the axial movement of frame 41 therein. For this purpose, frame 41 fits accurately in cylinder 42, which has a check valve 44 to permit air to escape from the cylinder. Reentry of the air may be through an orifice, the size of which can be adjusted to control the rate of motion of the frame 41 in cylinder 42.

Figure 2:
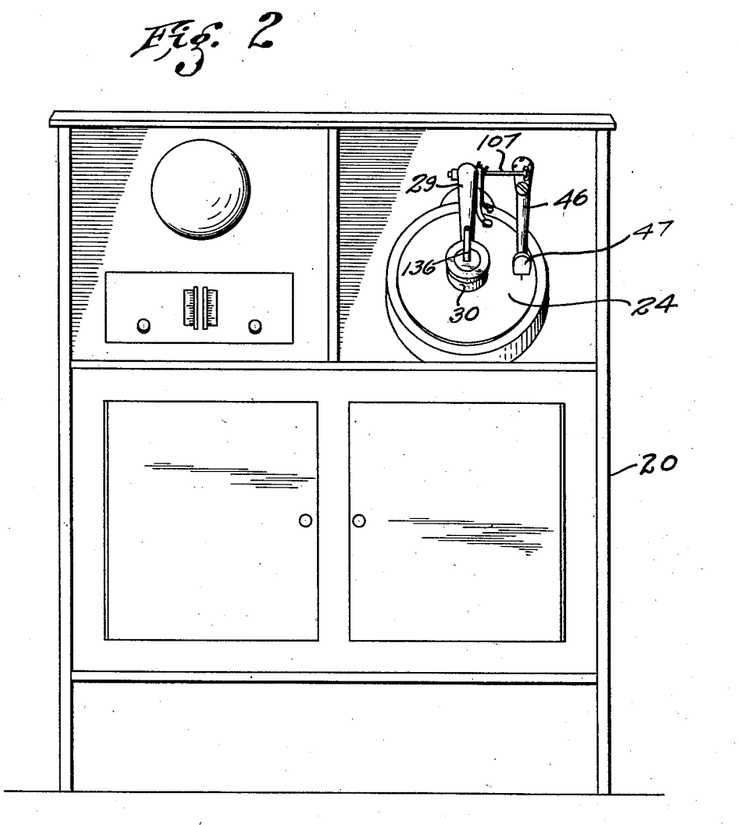
Fig. 2 is a front elevation of the cabinet that houses the phonograph, which cabinet is shown also accommodating a radio receiving set.

While the top record of stack 24 is being played, the frame 41 is urged outwardly from cylinder 42 to position the parts as shown in Fig. 1. For this purpose, I may use one or more springs 45 accommodated in an extension of cylinder 42 and acting against the bottom of frame 41. The arm 46 (Figs. 2, 3, and 8) carries a pick-up device 47 that is either electrical or mechanical for reproducing the sound. This is shown as having a needle 48 for engaging the grooves of the record. To permit this pick-up device to follow the spiral record, the arm 46 is pivoted on a vertical standard 49. It also has a pivoted front portion 50 whereby the pick-up device can be lifted above the records 24, but its downward movement is limited as by stop 51 on portion 50. In the present instance, the pick-up device 47 is indicated as electrical, and is provided with leads 52 to connect it to an amplifying and sound reproducing system.

When the top record is finished, the needle 48 is led into an eccentric groove, as is now quite common, and thereupon arm 46 is oscillated about its vertical pivot. In some types of records, the needle 48 is guided to an inner, smaller diameter groove. In either type, the movement of the arm 46 either oscillatory or toward the center, serves to initiate the mechanism for removing the top record from stack 24. I shall now describe the mechanism for accomplishing this function.

Figures 6, 7:
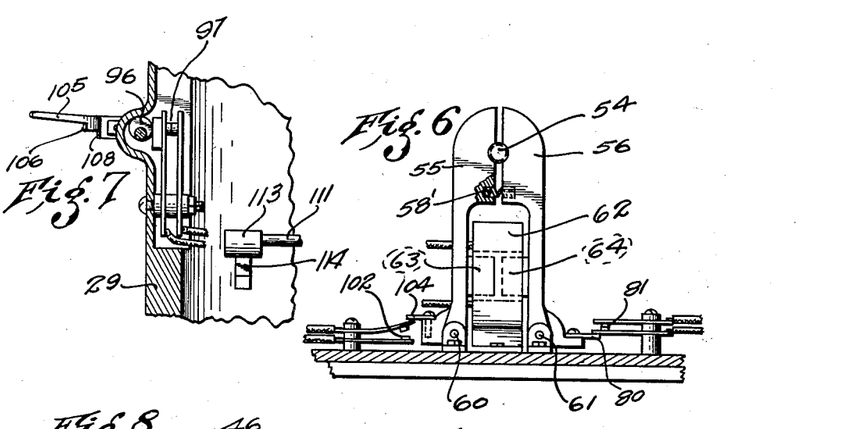
Fig. 6 is a view taken along plane 6—6 of Fig. 1.
Fig. 7 is a detail section taken along plane 7—7 of Fig. 3.

Referring particularly to Figs. 1 and 6, it is seen that the rotor 37 has a threaded extension 53, and spindle 25 has a threaded end portion 54, that extends beyond part 53. If a stationary nut be provided for each of these threaded parts, it is apparent that rotation of table 23 will cause the table as well as the spindle to move axially. By using the proper thread direction, this axial movement can be made such that the table 23 and spindle 25 are withdrawn from bearing 32. To form this stationary nut, I provide a pair of relatively movable jaws 55, 56. Each jaw has formed therein, internal threads 57, 58 arranged respectively to engage the threads 53 and 54.

While the phonograph is playing a record, the jaws 55, 56 are released from the threads, and are urged apart in any appropriate manner, as by the compression spring 58¹. These jaws can conveniently be pivoted at 60, 61 on stationary pivots. They can be urged together to engage the screw threads 53, 54 when the top record is to be removed. For example, an electromagnet 62 can be supported between the jaws, and arranged to act on pole pieces 63, 64 attached to the jaws, for drawing them together.

When this is accomplished, the table 23 and the stack 24 will be withdrawn in a direction away from head 32; and since the threads 54 have a larger pitch than threads 53, the spindle 25 will have an axial movement relative to the table 23. A spline 65 (Fig. 4) prevents relative rotation of the spindle and the table. Thus spindle 25 is withdrawn from the top record, and it is free to drop off the table by gravity. A cushioned hopper 66 (Fig. 1) serves as a convenient repectacle for the records, some of which are shown at 67.

Figures 8, 9, 10:
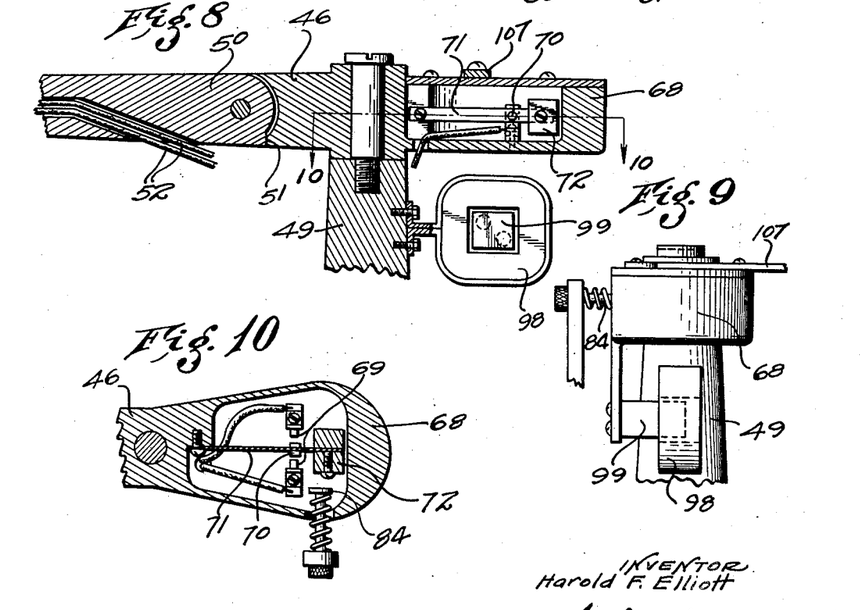
Fig. 8 is an enlarged detail section, taken along plane 8—8 of Fig. 3.
Fig. 9 is an end view of the back of the tone arm.
Fig. 10 is a sectional view, taken along plane 10—10 of Fig. 8.

The energization of magnet 62 is accomplished automatically by the arrival of needle 48 at the end of its travel on the record. Thus if there be an eccentric groove on the record, arm 46 will oscillate. This arm has a counterweight 68, which serves to accommodate a pair of spaced contacts 69 (Figs. 8 and 10). Between these contacts there is a contact 70 fastened on a thin flexible support 71 held at one end on arm 46. At the free end of support 71 there is a mass 72. Obviously as arm 46 oscillates, the support 71 will be flexed out of its normal position shown in Fig. 10 due to the inertia of weight 72; and contacts 69 and 70 will be alternately made and broken.

Figure 11:
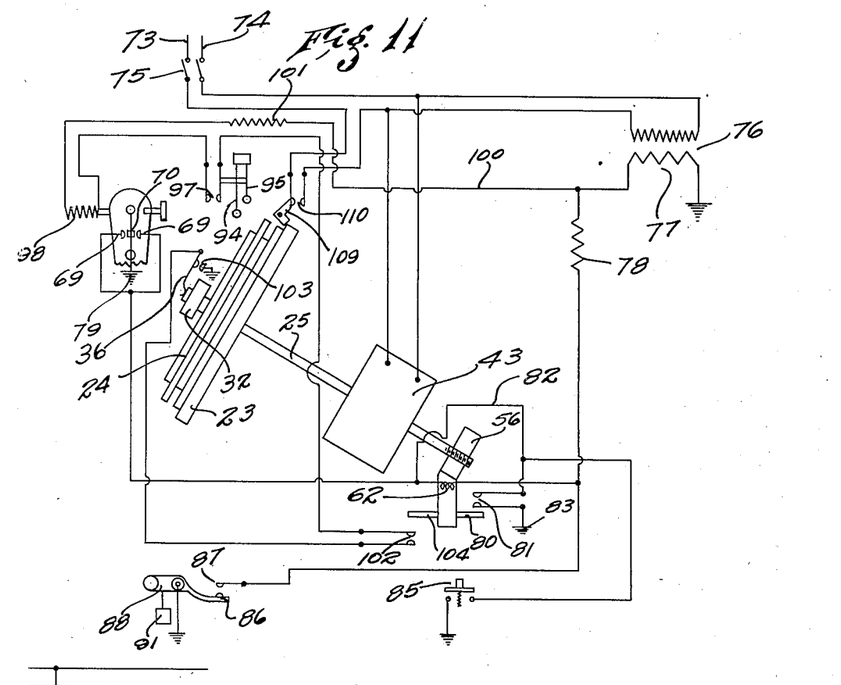
Fig. 11 is a diagrammatic wiring of the phonograph mechanism.

Referring now to the wiring diagram of Fig. 11, it can now be explained how contacts 69, 70 serve to produce activity of magnet coil 62. The mains 73, 74 can lead to a switch 75. Motor 43 is shown as energized from these mains and as controlled by the switch 75. Also controlled by the switch, is a transformer 76 serving to step down the voltage to a value suitable for the operation of the various magnet coils, such as 62, in the apparatus. One terminal of secondary 77 can be grounded. The circuit for coil 62 can now be traced.

This circuit includes resistor 78, coil 62, contacts 69 and 70, ground 79, back to the grounded side of secondary 77. Ground 79 is provided by flexible support 71. As soon as contact 70 engages either of contacts 69, the jaws 55, 56 close; and in closing, they operate a set of holding contacts, paralleling contacts 69, 70. Thus, referring to Figs. 6 and 11, jaw 56 can be provided with an arm 80 of insulation, which when the jaw moves to gripping position, serves to close contacts 81. As soon as this is accomplished, the oscillations of arm 46 are no longer needed to energize magnet coil 62. The holding circuit can be traced as follows: from secondary 77, to resistor 78, coil 62, lead 82, contacts 81, ground 83, back to the grounded terminal of secondary 77.

In case the record that is played has no eccentric groove, but has instead an inner, small diameter groove, contact can nevertheless be made between parts 69 and 70, by providing an abutment 84 extending into counterweight 68 to flex member 71 when the needle reaches the inner groove, and arm 46 is in its extreme position. Preferably the abutment 84 can be made to be a yielding one, to permit movement of arm 46 even after this abutment reaches the member 71.

It is also possible to start the rejecting operation by hand at any time, and even before the record has been fully played. This can be accomplished by the provision of a push button switch 85 that parallels contacts 69—70, and that can be momentarily depressed by hand.

The arrangement is such that as soon as the rejecting operation is completed, jaws 55, 56 are released by deenergizing magnet 62. For this purpose, I provide a pair of contacts 86, 87 that are arranged to produce a short circuit around coil 62. Due to the provision of resistor 78, this short circuit does not act to draw a heavy current from secondary 77. These contacts 86, 87 are operated by the falling of the rejected record. For this purpose, it is arranged to rotate an arm 88 in the path of the record as it slips off the stack 24. This arm is pivoted at 89 in supports 90, and serves to move contact 86 toward contact 87. As soon as the record passes arm 88, the contacts open and everything returns to normal.

When coil 62 is shorted as just described, and as jaws 55, 56 move apart to free the threads 53 and 54, the contacts 81 are opened due to the movement of arm 80; and the coil 62 remains deenergized. Due to the provision of a retarding mechanism, such as a one-way dash-pot 91 attached to arm 88, the short circuit of coil 62 is arranged to persist until the resetting operation is accomplished. If the short circuit be only momentary, the oscillating arm 46 would again cause energization of coil 62. With the short circuit existing for an appreciable period, there is an assurance that arm 46 will first be moved to the outer edge of the next record (in a manner to be hereinafter described) before the contacts 86, 87 open.

As soon as jaws 55, 56 release the spindle 25 and rotor 40, springs 45 urge the table 23 outwardly; and spring 92 can be used to urge the spindle 25 outwardly with respect to table 23. This spring is accommodated in a recess in rotor 40, its lower end abutting a plug 93 inserted in the recess and its upper end acting on a shoulder on the spindle. Obviously the table 23 will move outwardly under the influence of springs 45 to cause engagement between the top record of stack 24, with the member 26; and spindle 25 will be urged by its spring 92 into the depression in the bottom of member 26.

However, before these movements are completed, a mechanism is automatically controlled to return the pick-up arm 46 to the outer edge of the record. During the rejecting operation, as just described, the pivoted portion 50 of this arm was urged by gravity to cause engagement of stop 51 (Fig. 8) with the rear portion of the arm. As the table 23 completes its movement, the needle 48 is lifted very slightly, freeing the part 50 and permitting the pick-up device to float on the record.

As the stack of records 24 moves upwardly, it engages a pair of movable feelers 94 and 95. The arrangement is such that the outward movement of the stack moves at least one of the feelers to control the tone arm moving mechanism. Thus for example, the feeler 94 can be provided with an arm 96 pivoted in arm 29 about a horizontal axis, spaced from the active end of the feeler, so that there is a rotation of the feeler arm 96 to close contacts 97 supported and insulated in the hollow vertical portion of support 29. As soon as these contacts are made, which is considerably before the table reaches its outermost position, the mechanism for moving arm 46 is set into operation. This mechanism will now be described.

Referring to Figs. 8 and 9, there is shown a solenoid 98 supported beneath counterweight 68, and having a horizontal axis. This solenoid is arranged to act on a core 99 movable in the solenoid and carried by the tone arm mechanism; for example, underneath the counterweight 68. When the solenoid is energized, the tone arm 46 is moved electromagnetically toward the edge of the records on table 23. Contacts 97, controlled by feeler 94 control the circuit for this magnet. The circuit can now be traced in connection with Fig. 11.

The solenoid 98 is energized as follows: from secondary 77, lead 100, resistor 101, coil 98, contacts 97, contacts 102, contacts 103, back to ground. It is apparent that for this circuit to be energized, both sets of contacts 102 and 103 must be closed. The first set 102 is arranged to be closed only after jaws 55, 56 separate, to ensure that the tone arm 46 will not be moved until the rejection operation is completed. This function is effected by providing an arm 104 (Fig. 6) on jaw 55 that operates on the upper contact 102 to bring them into engagement as the jaw moves outward.

Figure 4:
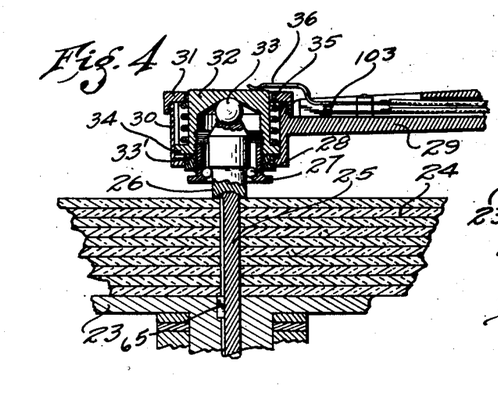
Fig. 4 is a detail section, taken along plane 4—4 of Fig. 3.

Contacts 103 are used to open the solenoid circuit as the table 23 moves into operative position. These contacts, as shown most clearly in Fig. 4, are operated by spring arm 56 which is engaged by the axially movable bearing member 32, to lift it and thereby to open the contacts. This bearing member, as explained heretofore, is urged upwardly by the movement of table 23, the springs moving the table overpowering the spring 35.

Figure 3:
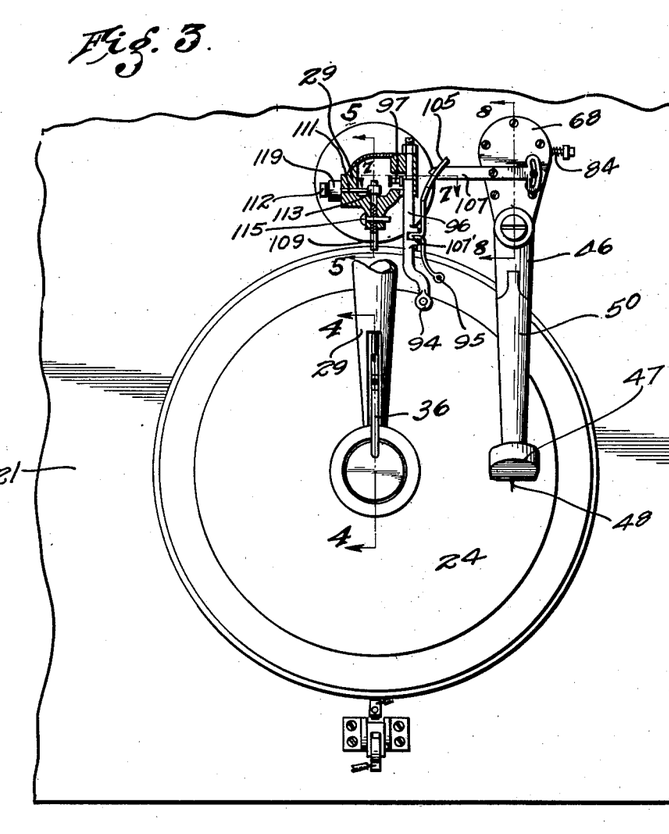
Fig. 3 is a view, taken from plane 3—3 of Fig. 1, showing some of the parts in section.

Referring now to Figs. 1, 3, and 7, I arrange matters in such a way that in case a 10 inch record be on top of stack 24, the arm 46 will not be moved out all the way; instead, a stop is provided. This stop in the present instance is indicated at 105, and is in the form of a bar having a shoulder 106 arranged to arrest the movement of an adjustable projection 107 placed over counterweight 68 and therefore movable with the arm 46. Stop 105 is formed as a part of the feeler 95, shown as pivoted at $107^1$ relative to feeler 94, but having only limited movement with respect thereto. If the top record is a 10 inch record, such as shown, the feeler 95 drops below feeler 94 and interposes the stop 105 in the path of bar 107. If however, the top record happens to be a 12 inch record, feeler 95 will be raised to the same level as feeler 94, and projection 107 will be stopped by a shoulder 108 spaced farther back on stop 105, to permit a larger travel of arm 46.

Figure 5:
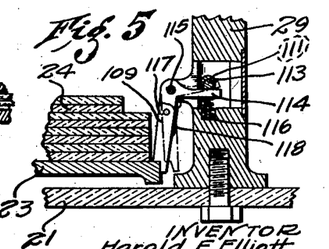
Fig. 5 is a detail section showing the operation of the device for controlling the axial movement of the table.

In order to load the table after all of the stack 24 has been played, I provide a catch 109 (Figs. 1, 3, and 5) that can engage the edge of the table and hold it in its lowermost position. Before this catch can be operated, a pair of contacts 110 (Fig. 11) must be opened, and such opening deenergizes the motor 43 and transformer 76, being in series to each. To accomplish this result, a rod 111 is journaled in arm 29 transversely thereof, and arranged to be manually rotated, as by thumb piece 112. This rod 111 carries an eccentric 113 operating on a lever arm 114 pivoted at 115, and normally urged upwardly, as by spring 116. The lever arm 114 is connected to another arm 117 carrying the catch 109. A spring 118 tends to straighten the catch as shown in Fig. 5, but when the catch is once released, movement of the table 23 downward is permitted due to the pivotal connection between catch 109 and arm 117.

Eccentric 113 normally releases arm 114 so that catch 109 is in the inoperative dot-and-dash position. Under such circumstances, contacts 110 located in a casing 119 (Fig. 3) are closed. To permit catch 109 to become active, eccentric 113 must be rotated to the position shown in Fig. 1, urging arm 114 downward. Such rotation of eccentric 113 opens contacts 110. Thus if it be desired to load table 23, knob 112 must first be rotated to shut down the mechanism; then table 23 can be urged downwardly until catch 109 is in place. The table 23 can then be conveniently loaded. After loading, knob 112 can be rotated to free arm 114, and at the same time, contacts 110 are closed. The mechanism then operates as hereinbefore set forth.

Figure 15:
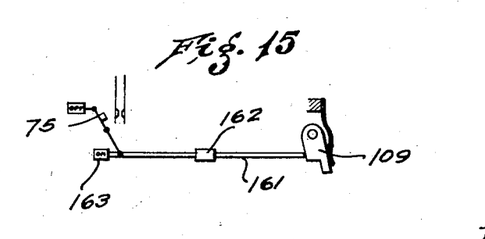
Fig. 15 is a diagram of an alternative form of control for the main operating circuit.

Instead of providing the rather complicated mechanism for ensuring that the catch 109 is freed before the motor 43 and the other mechanisms can be energized, I can use the simplified form shown in Fig. 15. In this figure, a link 161 slidable in support 162 forms a mechanical interlock between switch 75 and catch 109. When the "on" button 163 is pushed in, to energize the motor and transformer circuit, this link frees catch 109. Thus no contacts such as 110 need be used in this simplified form.

The mode of operation of the entire system can now be briefly summarized. After switch 75 is closed, and catch 109 released, the table 23 and stack 24 came into operating position. When a record is completely played, coil 62 is energized to cause jaws 55 and 56 to act as a stationary nut for withdrawing the table 23 and spindle 25, whereby the top record falls off the stack and into hopper 66. This record in falling, operates contacts 86, 87 to release magnet coil 62 and the jaws 55—56 separate. The table 23 and spindle 25 are then urged back to normal position. Just before reaching that position, coil 98 is energized through feeler contacts 97, contacts 103 and contacts 102 to pull the tone arm 46 to proper position to play the next record. Contacts 98 are so arranged that they are made a short interval before table 23 reaches its final position, and stop 105 is so arranged that its shoulders 106 and 108 are in proper position to stop the tone arm even before the table reaches that position.

In the form just described, the operations of rejection and resetting are accomplished by the aid of electro-magnets. However, purely mechanical means can be provided for these actions, such as cams or the like, driven intermittently by a source of motion, the energization of which depends upon the completion of a record or upon actuation of a rejection button. I show this form (in a skeletonized, diagrammatic manner only) in Figs. 12, 13, and 14.

Figure 12:
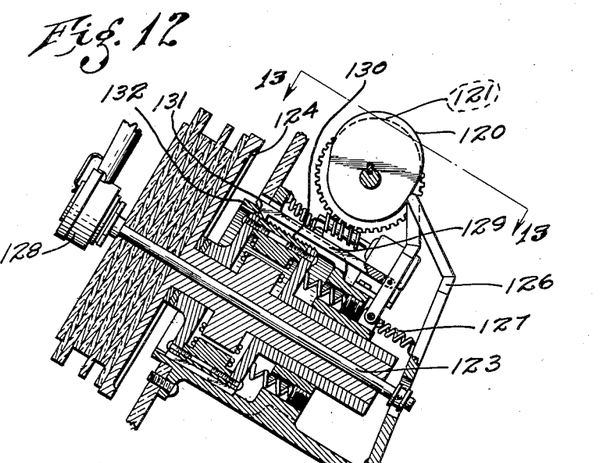
Fig. 12 is a diagrammatic section of a modified form of the structure.
Figure 13:
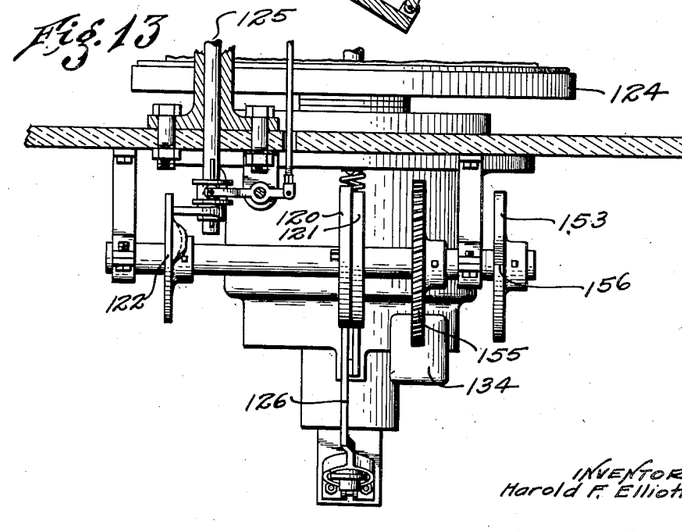
Fig. 13 is a diagrammatic side elevation of the form of my invention shown in Fig. 12.

Thus there are a number of cams 120, 121, 122, arranged respectively to retract spindle 123, to retract table 124, and to reset the tone arm 125. Cam 120 acts on lever 126, urged against it by spring 127 and connected to spindle 123. When the cam 120 is inactive, spring 127 pulls the spindle against head 128 as in the first embodiment. When the cam is rotated, the spindle is withdrawn sufficiently to drop the top record.

Cam 121 operates the table 124, urged as before by spring pressure toward the head 128. This cam operates a pawl 129 to engage teeth 130 on the motor housing and thereby to pull the table inwardly. When the cam 121 completes its movement, the pawl 129 is released by the sloping face 131 on a stationary member 132. In this way, the table 124 can move outwardly as far as necessary to position the top record under the pick up system.

Cam 122 operates the tone arm 125. It is in reality two crown cams, one serving to move arm 125 farther than the other, depending upon whether the top record is a 10 inch or a 12 inch record. The selection of the proper crown cam can be provided for by feelers operating in the same way as in the first embodiment. When the cam 122 becomes inactive, it moves sufficiently out of the way to permit the tone arm to move back to its inner position during the process of playing.

An electric motor 134 (Fig. 14) can be used conveniently to rotate the cams through one cycle upon a record being played or upon a rejection button being pressed. The electric control of this motor will now be described.

Figure 14:
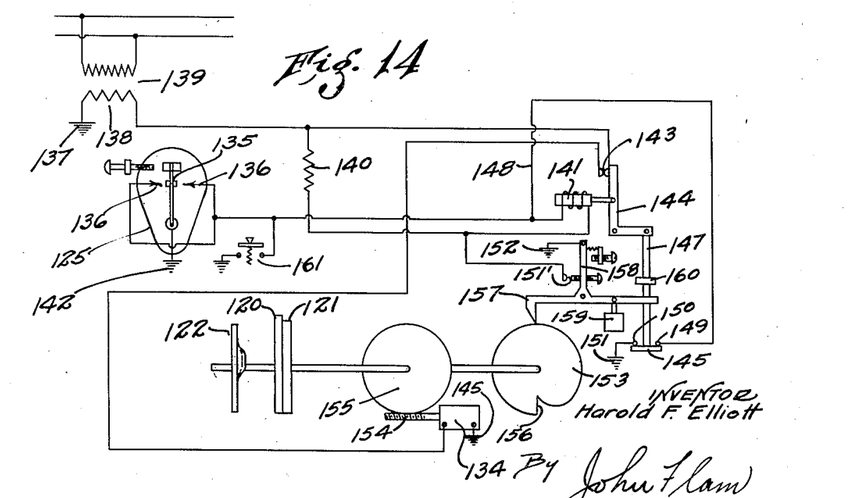
Fig. 14 is a diagrammatic wiring of the form shown in Figs. 12 and 13.

When the tone arm 125 reaches the end of the record, it serves to operate contacts 135, 136 in the same manner as described in connection with Figs. 8 and 10. These contacts close a circuit that can be traced as follows: ground 137 of a secondary coil 138 of a step down transformer 139, through coil 138, resistor 140, an electromagnet 141, contacts 136, 135 to ground 142. Thus coil 141 is momentarily energized, and operates to close relay contacts 143 by rotating a lever 144 against gravity. These contacts close a circuit for motor 134, that can be traced as follows: ground 137, coil 138, contacts 143, motor 134, and ground 145. Another circuit is also closed by a contact disc 146 operated by stem 147 attached to crank 44. This contact completes a holding circuit for coil 141, as follows: ground 137, coil 138, resistor 140, coil 141, connection 148, contacts 149 and 150, and ground 151. Thus even after contacts 135, 136 separate, the lever 144 is held in closing position. Motor 134 operates the cams through an appropriate gearing, as by worm 154 and wheel 155.

Motor 134 remains energized only until the cams 120, 121 and 122 complete their function. When they do, a pair of contacts 151[1] are automatically closed to short circuit coil 141, and lever 144 is released. The short circuit around coil 141 can be traced as follows: ground 137, coil 138, resistor 140, used to limit the flow of current, contacts 151, and ground 152.

The automatic actuation of contacts 151 is provided by a cam 153, that is driven by motor 134, and that can be made part of any one of the cams 120, 121 or 122. This cam has a notch 156 that permits a lever 157 to drop at the proper time. Since this lever is connected to arm 158 that carries one of the contact 151[1], this dropping performs the short circuiting function. Now as soon as the short circuit is effective. Motor 134 stops, as lever 144 is released. Releasing lever 144 permits a weight 160 carried by rod 147 to operate on lever 157 to raise it out of notch 156 and thereby to set the mechanism into proper position for the next operation of rejecting and resetting. A retarding mechanism 159 can be connected to lever 157 to retard its initial movement toward cam 153 and thereby to permit motor 134 to start for the next cycle even after weight 160 is lifted. This retardation however, is such that after the lever 157 reaches near the surface of cam 153, it has no further effect, and in this way, the lever will move quickly into notch 156 when the cam 153 is rotated far enough. This result can be accomplished by proper design of mechanism 159, as by providing a dash pot effective only for an initial movement of the parts controlled.

The rejection can be started at any time by the provision of a manual push button switch 161 paralleling the contacts 135, 136 just as in the first embodiment.

I claim:

1. In a phonograph, a turn table, the axis of the table being inclined to the vertical, a spindle extending through the table for accommodating a stack of records, means for pressing the records together, a pick-up device arranged to be actuated by the topmost record, and means for releasing the top record to permit it to fall from the table by gravity.

2. The combination as set forth in claim 1, in which is included means for withdrawing the spindle, and means for releasing the pressure on the stack.

3. In a phonograph, a turn table arranged to accommodate a stack of records, a tone arm for operating on the top record, means whereby the top record can be removed, and means for resetting the tone arm to begin a record, including a pair of feelers at different radial distances from the table axis, and a stop operated by the feelers for selectively stopping the tone arm resetting movement to ensure that it will be properly positioned for any of two sizes of records.

4. A phonograph having a record following arm and arranged to be oscillated by the inner groove of the record when it is through playing the record, a mechanism for resetting the arm, and control means for the reset mechanism operated by the inertia of the arm as it is oscillated.

5. In a tone arm mechanism for a phonograph, means for oscillating the tone arm, a contact member yieldingly supported on the tone arm, a contact member cooperating therewith and also carried by the tone arm, said yieldingly supported contact moving toward and from the other contact due to inertia as the tone arm is oscillated, and means controlled by the contacts for moving the tone arm.

6. In a phonograph, a turntable, means for rotating the table, a spindle axially movable with respect to the table, a portion of the spindle being threaded, a member having internal threads for cooperating with the spindle threads and as it rotates to move it axially of the table, and means controlling said member to engage and disengage it from the spindle threads.

7. The combination as set forth in claim 6, in which the controlling means for the member acts in response to the completion of the playing of a record on the table.

8. The combination as set forth in claim 6 with the addition of means for also moving the table axially, but at a slower rate than the spindle, said means including a table supporting structure, threaded members cooperating with a threaded part of the table supporting structure and means for controlling the engagement of the members with the table structure.

9. In a phonograph, a turntable, means for rotating the table, a spindle axially movable with respect to the table, a portion of the spindle being threaded, a member having internal threads for cooperating with the spindle threads and as the spindle rotates to move it axially of the table, and means controlling said member to engage and disengage it from the spindle threads, including an electromagnet operated in response to the completion of the playing of a record on the table.

10. In a phonograph, a rotatable turntable, a stationary head, means yieldingly urging the table toward the head, a spindle extending through the table and arranged to be axially movable thereto but not relatively rotatable, said spindle being arranged to accommodate a stack of records, the axis of the table being inclined to the vertical and means for moving the table away from the head and also for axially moving the spindle with respect to the head, whereby the top record can fall from the stack by gravity.

In testimony whereof I have hereunto set my hand.

HAROLD F. ELLIOTT.